United States Patent [19]
Humphrey

[11] Patent Number: 5,261,213
[45] Date of Patent: Nov. 16, 1993

[54] GREENSROLLER

[76] Inventor: John L. Humphrey, 327 Willowpointe Dr., St. Charles, Mo. 63304

[21] Appl. No.: 925,992

[22] Filed: Aug. 6, 1992

[51] Int. Cl.⁵ ............ A01D 34/44; A01D 34/62; E01C 19/26; E01C 19/28
[52] U.S. Cl. ............................................. 56/2; 56/7; 56/249.5; 56/DIG. 9; 404/117; 404/128
[58] Field of Search ............ 56/2, 249.5, 294, DIG. 9, 56/DIG. 20, 14.7, 16.7, 16.9, 11.9, 6, 7; 404/117, 122, 128

[56] References Cited

U.S. PATENT DOCUMENTS

| | | | |
|---|---|---|---|
| 2,731,781 | 1/1956 | MacVicar | 56/249.5 |
| 2,770,938 | 11/1956 | Kiernan | 56/2 |
| 3,203,160 | 8/1965 | Thomas | 56/12.7 |
| 3,225,669 | 12/1965 | Green | 404/117 |
| 3,598,029 | 8/1971 | Paramythioti | 404/117 |
| 3,816,985 | 6/1974 | Sorenson et al. | 56/7 |
| 3,958,892 | 5/1976 | Bosslet et al. | 404/117 |
| 4,040,761 | 8/1977 | Rahn | 404/86 |
| 4,481,757 | 11/1984 | Tsuchiya | 56/16.9 |
| 4,749,305 | 6/1988 | Brown et al. | 404/117 |

OTHER PUBLICATIONS

USGA Green Section Record, May-Jun. 1992, p. 10 Turf Tips-More of the Best "Shake, Rattle, and Roll!".
Golf Course News, Jul. 1992, pp. 14-16 The rolling of the green.
Trade literature on Speed Roller distributed by Commercial Turf.
Trade literature on Smooth Roll from Turf Engineering distributed by Woodbay Enterprises.

Primary Examiner—Stephen J. Novosad
Attorney, Agent, or Firm—Grace J. Fishel

[57] ABSTRACT

A powered lawn mower of the type particularly adapted for mowing greens on golf courses and having a powered vertically adjustable reel cutting unit is converted into a greensroller when a vibratory roller unit is substituted for each reel cutting unit. The vibratory roller unit has a drum, an unbalanced shaft and a framework. The unbalanced shaft is rotatably mounted within the drum and the drum is rotatably mounted in the framework. When the greensroller is powered over a golf green, it provides a fast, smooth, consistent and somewhat firm playing surface without scalping or otherwise compromising the health of the grass.

20 Claims, 3 Drawing Sheets

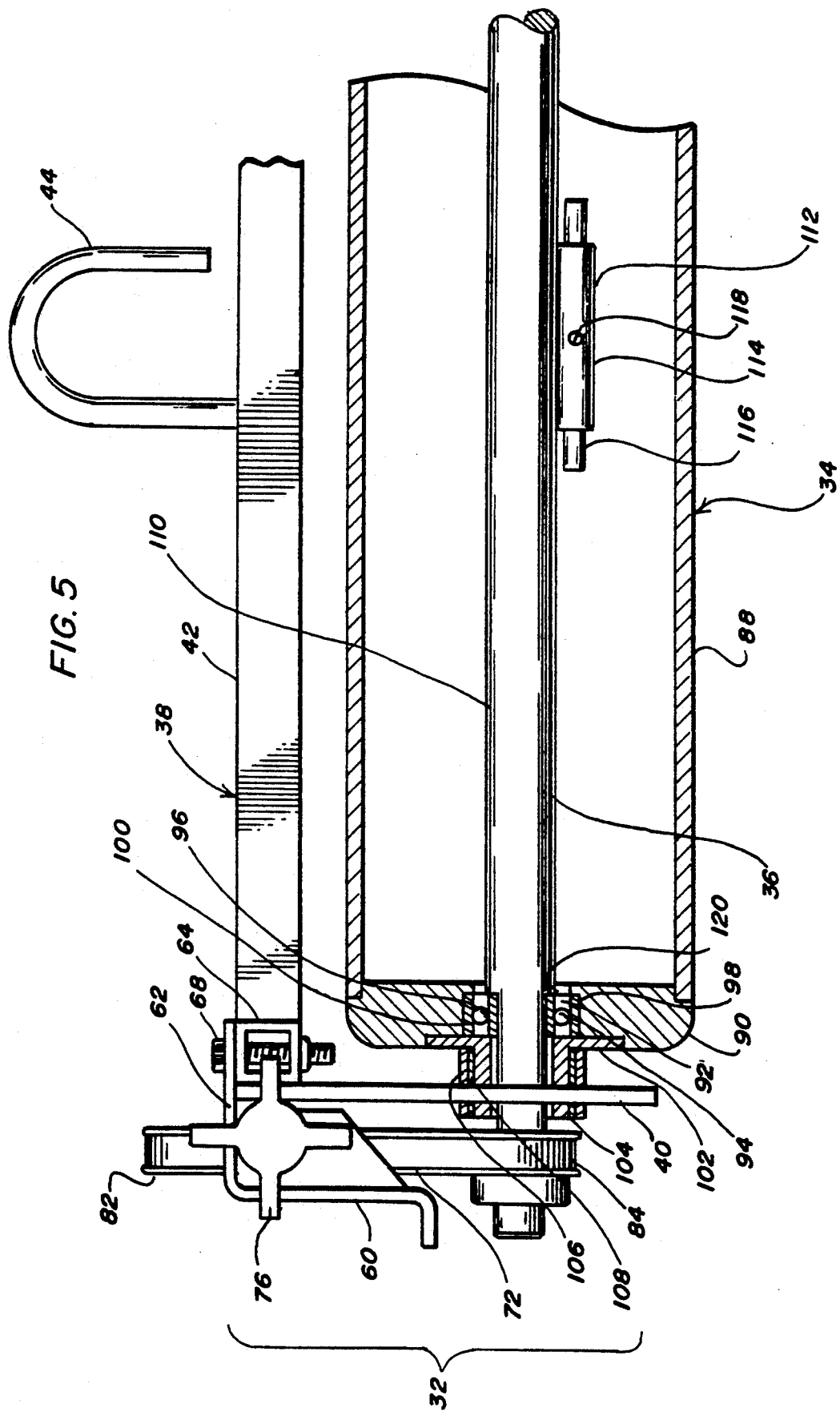

GREENSROLLER

BACKGROUND OF THE INVENTION

1. Field of the Invention

A powered lawn mower of the type particularly adapted for mowing greens on golf courses and having a powered vertically adjustable reel cutting unit is converted into a greensroller.

2. Brief Description of the Prior Art

Golf greens require a healthy stand of grass but golfers demand fast greens. The usual greens maintenance program includes aerification, reducing mowing height, double mowing, vertical mowing, grooming, light topdressing and reducing fertility. Greens speed is increased by lowering mowing height but this jeopardizes the health of the turf. Turf health is improved by aerification to relieve compaction but this causes surface unevenness. Greensrollers have been proposed as a means of providing a fast, smooth, consistent and somewhat firm playing surface without scalping the grass.

One idea for a greensroller is to remove the front reel on a walkbehind greensmower and mount a large-diameter pipe in its place. The pipe is filled with lead providing a heavy weight on the front roller part of the mower. A walkbehind greensroller does not cover a wide swath of the green and its use is labor intensive.

There are riding machines which are dedicated to being greensrollers. One such machine is the Speed Roller manufactured by Friend Manufacturing Corp. of Gasport, New York. A similar greensroller is available from Australia and is being distributed by Woodbay Enterprises of Phoenix, Arizona. These machines have various shortcomings including that of cost.

It would be desirable to have a riding greensroller which did not require the purchase of a machine totally dedicated to being a greensroller. Most golf courses already have multiple deck riding lawn mowers that have powered vertically adjustable reel cutting units but they cannot be converted into a greensroller by simply swapping a weighted roller for the reel. This is because the hydraulics for lifting the cutting units are not suitable for lifting a heavy weighted roller.

SUMMARY OF THE INVENTION

In view of the above, it is an object of the present invention to convert a lawn mower having a powered vertically adjustable reel cutting unit into a greensroller. Other objects and features of the invention will be in part apparent and in part pointed out hereinafter.

In accordance with the invention, a greensroller is formed by replacing each reel cutting unit on a lawn mower of the type particularly adapted for mowing greens on golf courses with a vibratory roller unit. More particularly, the lawn mower is of a type having a power means for raising and lowering a lift bar from which the reel cutting unit is removed. The reel cutting unit is driven by the power means and is of the type wherein a transversely extending cutting reel and bed knife assembly is carried by a frame. There is a means for attaching the frame to the lift bar.

The vibratory roller unit has a framework with a means for attaching the framework to the lift bar. A transversely extending drum is rotatably mounted in the framework. The drum is lifted in and out of contact with the ground under the greensroller by the lift bar and when in contact follows the ground as the greensroller is moved. An unbalanced shaft is driven by the power means and is rotatably mounted within the drum. The unbalanced shaft applies a centrifugal force which is transmitted to the drum and applied to the ground under the drum as the drum rolls across the ground.

The invention summarized above comprises the constructions hereinafter described, the scope of the invention being indicated by the subjoined claims.

BRIEF DESCRIPTION OF THE DRAWINGS

In the accompanying drawings, in which several of various possible embodiments of the invention are illustrated, corresponding reference characters refer to corresponding parts throughout the several views of the drawings in which:

FIG. 5 is a front elevational view of the vibratory roller unit, partly in cross section; and, FIG. 6 is a perspective view of a lift bar attached to a swivel joint.

DETAILED DESCRIPTION OF THE INVENTION

Figure 1:
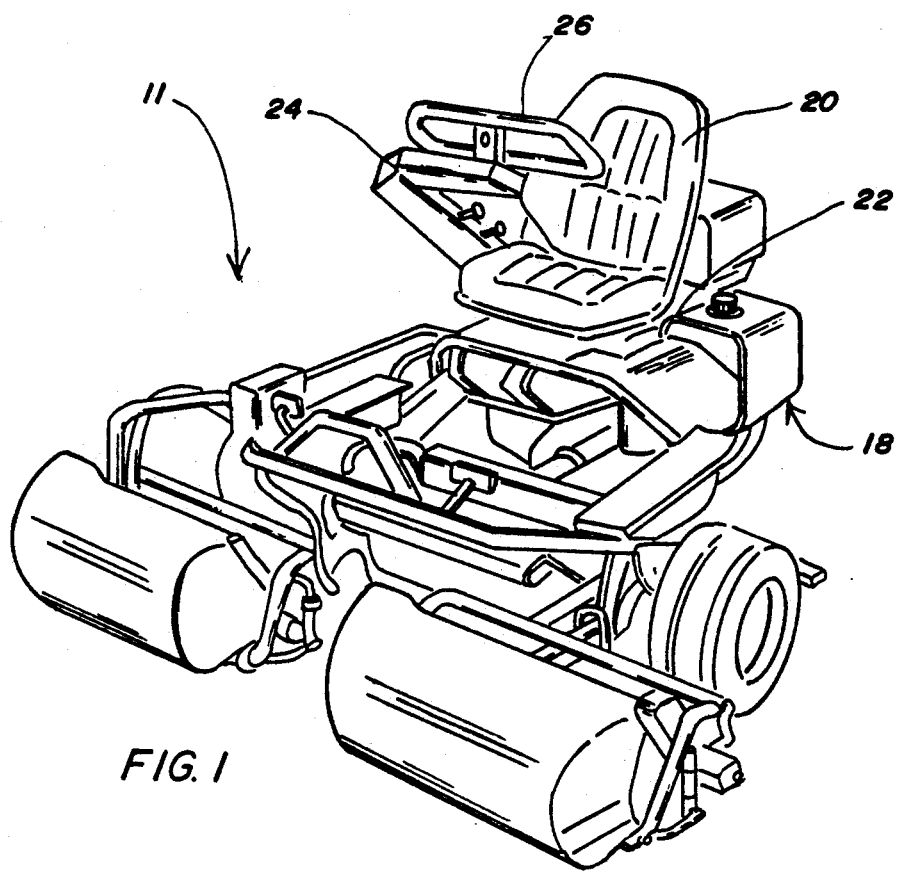
FIG. 1 is a perspective view of a powered lawn mower with powered vertically adjustable reel cutting units.

Referring to the drawings more particularly by reference character, reference numeral 10 refers to a greensroller in accordance with the present invention. Greensroller 10 comprises a lawn mower 11 of a type having a power means such as a hydraulic system 12 for raising and lowering a lift bar 14 from which the reel cutting units have been removed. Stemming from lawn mower 11, greensroller 10 includes a frame 16 and wheels 18 for movably supporting frame 16. A seat 20 for the operator and an engine 22 for powering hydraulic system 12 are mounted on and carried by frame 16. A steering housing and control panel 24 is disposed forwardly of seat 20 with a steering wheel 26 in front of seat 20.

Figure 6:
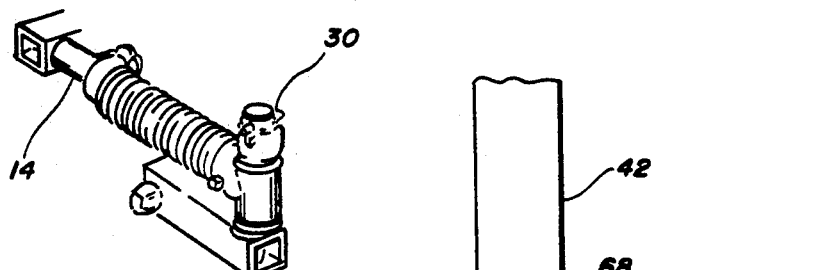

The reel cutting units are of a kind wherein a transversely extending cutting reel and bed knife assembly is carried by a frame. In lawn mower 11 illustrated in FIG. 1, the reel cutting unit is attached to lift bar 14 with a hook and mounted in a pull frame 28. In other lawn mowers 11, the reel cutting unit is attached to lift bar 14 on a swivel 30 as shown in FIG. 6.

Figure 2:
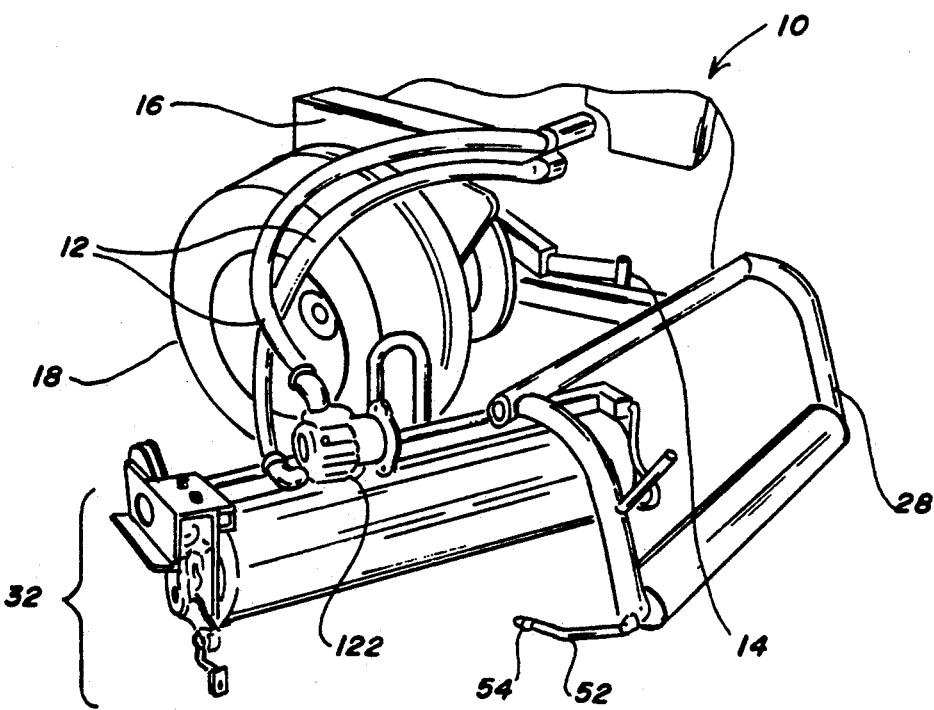
FIG. 2 is an enlarged detail in perspective of the mower shown in FIG. 1 from which a reel cutting unit has been removed and a vibratory roller unit in accordance with the present invention is in the process of being attached.

A vibratory roller unit 32 in accordance with the present invention is shown detached from lift bar 14 and pull frame 28 in FIG. 2. Vibratory roller unit 32 includes in major part a transversely extending drum 34, an unbalanced shaft 36 and a framework 38. Unbalanced shaft 36 is rotatably mounted within drum 34 and drum 34 is rotatably mounted in framework 38. Vibratory roller unit 32 is designed such that it has the same or nearly the same weight as the reel cutting unit that it replaces so that it does not strain the hydraulics which are provided for lifting the reel cutting unit.

Figure 3:
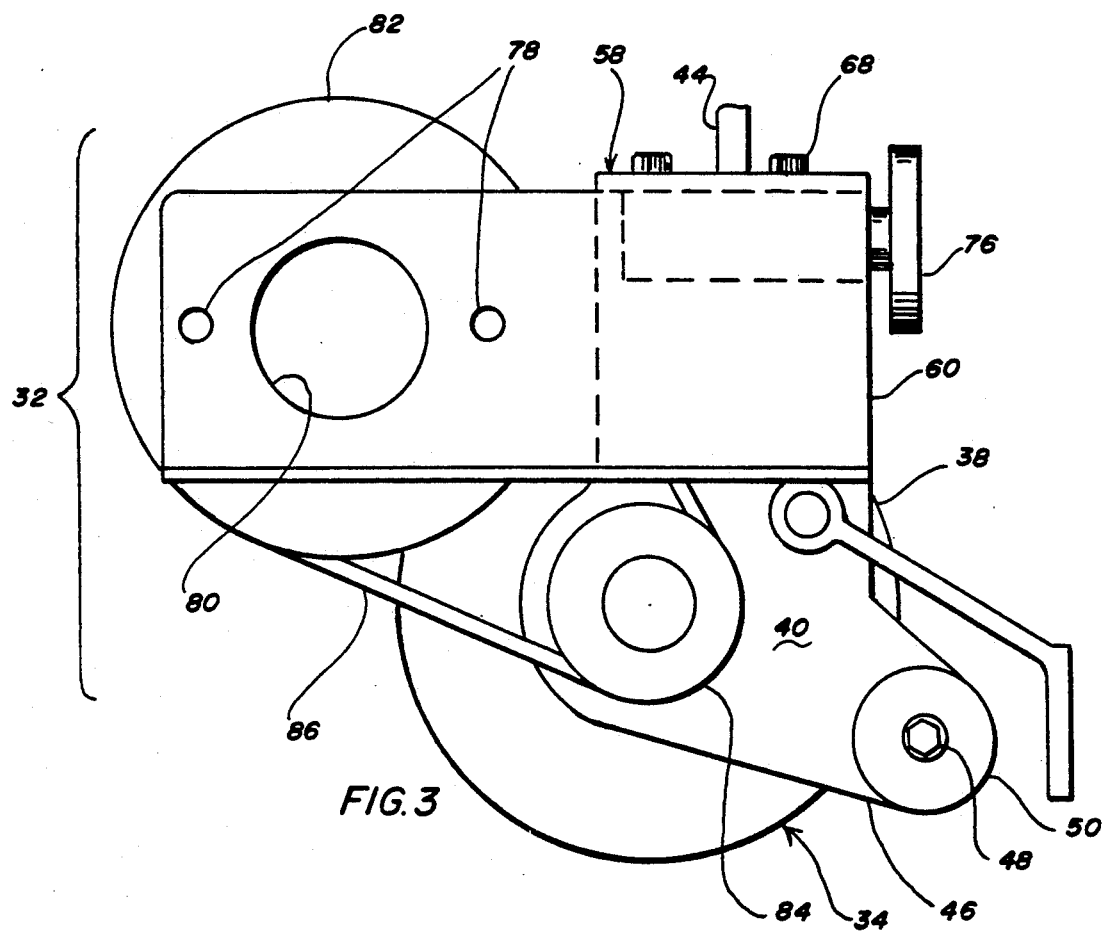
FIG. 3 is an end view of the vibratory roller unit as viewed from the motor mount side.
Figure 4:
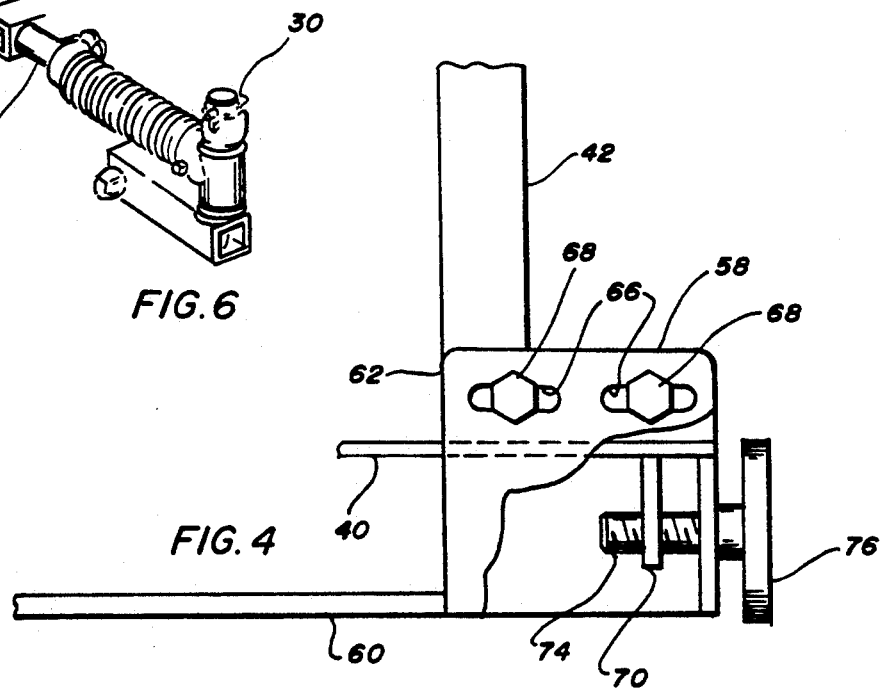
FIG. 4 is a top view of the vibratory roller unit on the motor mount side.

More particularly as shown in FIGS. 3-5, framework 38 comprises a pair of spaced apart, parallel side plates 40. Side plates 40 are connected along a top edge with a cross member 42. A hook 44 (serving as means for lifting vibratory roller unit 32 with lift bar 14) is attached at the midpoint of cross member 42. A pad or a rubber coating may be provided where hook 44 contacts lift bar 14. Alteratively, swivel 30 as shown in FIG. 6 may replace hook 44 depending on the nature of the riding lawn mower (e.g., Jacobsen versus Toro). A toe 46 is provided along a bottom forward side edge of side plates 40. Attached to toe 46 is a ball socket 48 on a rubber grommet 50. Rubber grommet 50 acts as an anti-vibration, dampening device. Pull frame 28 has a pair of lift arms 52, each of which terminates in a socket-ball joint receiver 54 for attachment of vibratory roller unit 32 by ball socket 48. An anti-roll arm 56 is attached to the forward side edge of one of side plates 40. A free end of anti-roll arm 56 is threaded on one of lift arms 52. The purpose of anti-roll arm 56 is to keep vibratory roller unit 32 in a generally vertical position as shown. Alternatively, at greater cost and with added weight, flanking rollers could be attached to side plates 40 on one or both sides of drum 34.

One of side plates 40 has an adjustable motor mount 58. In other multiple deck lawnmowers, the reel cutting units are not all driven from the same side so that some of the motor mounts are on the left while others are on the right. As best seen in FIGS. 3-4, adjustable motor mount 58 includes a flanged plate 60 connected at a right angle to a flat plate 62. The top edge of side plate 40 is backed with a piece of square tubing 64. Flat plate 62 has a pair of elongated slots 66 and rests on the top edge of side plate 40 and accross tubing 64. A pair of bolts 68 pass through elongated slots 66 and into tapped holes provided for that purpose in tubing 64. Bolts 68 secure flat plate 62 in a selected position. A flange 70 protrudes along the outside of side plate 40. Along the forward end edge, a gusset 72 connects flat plate 62 to flanged plate 60. Gusset 72 and flange 70 are tapped for receipt of a threaded rod 74 mounted on a handle 76. Flanged plate 60 includes holes 78 for motor mounting bolts and an aperture 80 through which a motor drive shaft or other suitable power means extends for attachment to a drive pulley 82. A driven pulley 84 is attached to the outside of side plate 40 below motor mount 58. Drive pulley 82 is connected to driven pulley 84 with a belt 86. The tension on belt 86 can be adjusted by loosening bolts 68 and adjusting motor mount 58 back and forth on threaded rod 74. Drive pulley 82 should be sized such that driven pulley 84 spins at increased speed.

Referring now to FIG. 5, drum 34 is a hollow cylinder 88 capped with end plates 90. End plates 90 have a central hole flanked by a first and second concentric recesses 92 and 94, respectively. A roller bearing 96 with an inner race 98 and an outer race 100 is press fit into first recess 92. Unbalanced shaft 36 is journaled in roller bearing 96. A circular plate 102 with an attached collar 104 is bolted into the second recess 94. The back of circular plate 102 holds roller bearing 96 in first recess 92 and first collar 104 serves as the drum axle. A larger second collar 106 is provided about an aperture in side plate 40. First collar 104 (i.e., the drum axle) is journaled within second collar 106 on a bushing 108. On one end of drum 34, unbalanced shaft 36 extends beyond second collar 106 for connection to driven pulley 84.

Unbalanced shaft 36 includes a rod 110 and an eccentric flyweight 112. In the embodiment shown in FIG. 5, flyweight 112 is a hollow tube 114 attached to rod 110 within which a heavy bar 116 is held with a set screw 118. Opposite ends of rod 110 include an abutment shoulder 120 upon which end plates 90 are seated. To equalize vibratory forces on drum 34, it is preferred that flyweight 112 be positioned further away from the motor side than from the opposite side. This offset compensates for the fact that the weight is greater on the motor side of vibratory roller unit 32.

The reel cutting units on lawn mower 11 are driven by a power means (e.g. a hydraulic motor 122 powered by hydraulic system 12). In use, hydraulic motor 122 is removed from each reel cutting unit and is then connected to drive pulley 82 on vibratory roller unit 32. As driven pulley 84 rotates rod 110, flyweight 112 applies a centrifugal force on rod 110. This force is transmitted to drum 34 through the intermediary of roller bearings 96 on which rod 110 rotates. Drum 34 rolls on bushing 108 with the ground speed of greensroller 10 as it is propelled on wheels 18.

By changing the mass of flyweight 112, the force applied to the ground can be varied. Variations in rotation speed of unbalanced shaft 36 also has an effect on the force. When the unbalanced shaft is rotated at about 5,000 rpm, the force on the bottom of drum 34 is calculated to be about 7.5 psi when it is pressed into the turf about 1/32 inch. Experimental tests with greensroller 10 under these conditions have been satisfactory. Rotations of unbalanced shaft 36 at materially slower speeds may result in corrugations. The force applied to the ground by drum 34 is inversely dependent upon the depth to which drum 34 is pressed into the turf (i.e., force decreases as contact area increases) so that when drum 34 is pressed down ⅛ inch, the force is much less.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A greensroller comprising
   a lawn mower of a type having a power means for raising and lowering a lift bar from which a reel cutting unit has been removed, said reel cutting unit being driven by the power means and being of a type wherein a transversely extending cutting reel and bed knife assembly is carried by a frame, said frame having means for attaching the frame to said lift bar; and,
   a vibratory roller unit comprising a framework with a means for attaching the framework to said lift bar, a transversely extending drum rotatably mounted in the framework, said drum lifted in and out of contact with the ground under the greensroller by the lift bar and when in contact following the ground as the greensroller is moved and an unbalanced shaft driven by the power means and rotatably mounted within the drum whereby the unbalanced shaft applies a centrifugal force which is transmitted to the drum and applied to the ground under the drum as the drum rolls across the ground.

2. The greensroller of claim 1 wherein the lawn mower has a pull frame from which the reel cutting unit has been removed, said pull frame having a pair of lift arms and said vibratory roller unit attached to the lift arms and further having an anti-roll arm connecting the framework with one of said lift arms.

3. The greensroller of claim 1 wherein the power means for the reel cutting means is connected to a drive pulley which is connected to a smaller driven pulley for rotating the unbalanced shaft, said drive and driven pulleys mounted on one side of the framework of the vibratory roller unit.

4. The greensroller of claim 3 wherein the unbalanced shaft comprises a rod with a flyweight, said flyweight offset on the rod to compensate for the weight of the power means.

5. The greensroller of claim 4 with means for varying the mass of the flyweight whereby the force applied to the ground can be varied.

6. A greensroller comprising
a lawn mower of a type having a pull frame and a hydraulic system for raising and lowering a lift bar from which a reel cutting unit has been removed, said reel cutting unit being driven by a hydraulic motor powered by the hydraulic system, said reel cutting unit being of a type wherein a transversely extending cutting reel and bed knife assembly is carried by a frame, said frame having means for attaching the frame to said lift bar and means for attaching the frame to the pull frame; and,
a vibratory roller unit comprising a framework with a means for attaching the framework to said lift bar and to a pair of lift arms attached to the pull frame, a transversely extending drum rotatably mounted in the framework, said drum lifted in and out of contact with the ground under the greensroller by the lift bar and when in contact following the ground as the greensroller is moved and an unbalanced shaft driven by the hydraulic motor and rotatably mounted within the drum whereby the unbalanced shaft applies a centrifugal force which is transmitted to the drum and applied to the ground under the drum as the drum rolls across the ground.

7. The greensroller of claim 6 further having an anti-roll arm connecting the framework of the vibratory roller unit with one of the lift arms of the pull frame.

8. The greensroller of claim 6 wherein the hydraulic motor is connected to a drive pulley which is connected to a smaller driven pulley for rotating the unbalanced shaft, said drive and driven pulleys mounted on one side of the framework of the vibratory roller unit.

9. The greensroller of claim 8 wherein the unbalanced shaft comprises a rod with a flyweight, said flyweight offset on the rod to compensate for the weight of the hydraulic motor.

10. The greensroller of claim 9 with means for varying the mass of the flyweight whereby the force applied to the ground can be varied.

11. A vibratory roller unit adapted for use on a lawn mower of a type having a power means for raising and lowering a lift bar from which a reel cutting unit has been removed, said reel cutting unit being driven by the power means and being of a type wherein a transversely extending cutting reel and bed knife assembly is carried by a frame, said frame having means for attaching the frame to said lift bar;
said vibratory roller unit comprising a framework with a means for attaching the framework to said lift bar, a transversely extending drum rotatably mounted in the framework, said drum lifted in and out of contact with the ground by the lift bar and when in contact following the ground and an unbalanced shaft driven by the power means and rotatably mounted within the drum whereby the unbalanced shaft applies a centrifugal force which is transmitted to the drum and applied to the ground under the drum as the drum rolls across the ground.

12. The vibratory roller unit of claim 11 wherein the lawn mower has a pull frame from which the reel cutting unit has been removed, said pull frame having a pair of lift arms and said vibratory roller unit is attached to the lift arms and further has an anti-roll arm connecting the framework with one of said lift arms.

13. The vibratory roller unit of claim 11 wherein the power means for the reel cutting means is connected to a drive pulley which is connected to a smaller driven pulley for rotating the unbalanced shaft, said drive and driven pulleys mounted on one side of the framework of the vibratory roller unit.

14. The vibratory roller unit of claim 13 wherein the unbalanced shaft comprises a rod with a flyweight, said flyweight offset on the rod to compensate for the weight of the power means.

15. The vibratory roller unit of claim 14 with means for varying the mass of the flyweight whereby the force applied to the ground can be varied.

16. A vibratory roller unit adapted for use on a lawn mower of a type having a pull frame and a hydraulic system for raising and lowering a lift bar from which a reel cutting unit has been removed, said reel cutting unit being driven by a hydraulic motor powered by the hydraulic system, said reel cutting unit being of a type wherein a transversely extending cutting reel and bed knife assembly is carried by a frame, said frame having means for attaching the frame to said lift bar and means for attaching the frame to the pull frame;
said vibratory roller unit comprising a framework with a means for attaching the framework to said lift bar and to a pair of lift arms attached to the pull frame, a transversely extending drum rotatably mounted in the framework, said drum lifted in and out of contact with the ground by the lift bar and when in contact following the ground and an unbalanced shaft driven by the hydraulic motor and rotatably mounted within the drum whereby the unbalanced shaft applies a centrifugal force which is transmitted to the drum and applied to the ground under the drum as the drum rolls across the ground.

17. The vibratory roller unit of claim 16 further having an anti-roll arm connecting the framework of the vibratory roller unit with one of the lift arms of the pull frame.

18. The vibratory roller unit of claim 16 wherein the hydraulic motor is connected to a drive pulley which is connected to a smaller driven pulley for rotating the unbalanced shaft, said drive and driven pulleys mounted on one side of the framework of the vibratory roller unit.

19. The vibratory roller unit of claim 18 wherein the unbalanced shaft comprises a rod with a flyweight, said flyweight offset on the rod to compensate for the weight of the hydraulic motor.

20. The vibratory roller unit of claim 19 with means for varying the mass of the flyweight whereby the force applied to the ground can be varied.

* * * * *